(12) United States Patent
Xu et al.

(10) Patent No.: US 6,911,810 B2
(45) Date of Patent: Jun. 28, 2005

(54) REDUCTION OF ENERGIZATION TRANSIENTS IN A THREE PHASE Y-CONNECTED LOAD

(75) Inventors: Wilsun Xu, 27 Rhatigan Road, East, Edmonton, Alberta (CA), T6R 1N1; Yu Cui, Edmonton (CA)

(73) Assignees: Wilsun Xu, Edmonton (CA); Governors of the Shandong University, Jinan (CN)

( * ) Notice: Subject to any disclaimer, the term of this patent is extended or adjusted under 35 U.S.C. 154(b) by 149 days.

(21) Appl. No.: 10/617,635

(22) Filed: Jul. 11, 2003

(65) Prior Publication Data

US 2005/0007795 A1 Jan. 13, 2005

(51) Int. Cl.[7] .................................................. H03H 1/00
(52) U.S. Cl. ...................................................... 323/364
(58) Field of Search ............................... 323/205, 208, 323/209, 364; 363/39, 49, 50; 318/700, 705, 727, 729, 738, 778

(56) References Cited

U.S. PATENT DOCUMENTS 5,321,340 A * 6/1994 Tamaki et al. ............... 318/696
5,570,257 A * 10/1996 Manning et al. ............... 361/76
6,630,804 B2 * 10/2003 Moriya et al. ................. 318/85

OTHER PUBLICATIONS

Holmgrem, B., Transformer Inrush Current, Chapter 12–03, pp. 1–13, 196?.
Yacamini, R., The Calculation of Inrush Current in Three-Phase Transformers, IEEE Proceedings, vol. 133, Pt. B. No. 1, Jan. 1986.
Mafuve, I.M., Soft Start of AC Machines by Sequential Phase Switching, Proceedings of the Unit. Power Engineering Conference, 1999, Lecester, United Kingdom.
Ofuji, S., New Switching Sequence for Three Phase Converter, IEEE, PCC– Nagaoka 1997, pp. 797–800.

* cited by examiner

Primary Examiner—Matthew V. Nguyen
(74) Attorney, Agent, or Firm—Wong, Cabello, Lutsch, Rutherford & Brucculeri, LLP

(57) ABSTRACT

Reduction of energization transients in a three phase Y-connected load having legs A, B and C associated with corresponding phases of a three-phase AC power system is achieved by energizing respective legs of the load in an order determined by a energization sequence dependent upon a type of the load. The energization sequence defines first, second and third legs of the legs A, B and C to be energized. A conduction path for current to flow between a neutral point of the Y-connected load to ground through a transient-limiting impedance while the first, second and third legs are being energized is employed. The transient limiting impedance has an impedance value selected such that after the first leg is energized, an energization transient produced on energizing the second leg and an energization transient produced on energizing the third leg are both approximately minimized.

70 Claims, 5 Drawing Sheets

REDUCTION OF ENERGIZATION TRANSIENTS IN A THREE PHASE Y-CONNECTED LOAD

BACKGROUND OF THE INVENTION

1. Field of Invention

This invention relates to reduction of energization transients in three phase power systems and more particularly to a method of reducing energization transients in a Y-connected load and to an energization transient limited three phase AC power system apparatus.

2. Description of Related Art

Transformers, reactors and capacitors are common equipment in utility power systems. When such equipment is energized by a power system it normally produces energization transients such as voltage and/or current surges. These transients are often the result of inrush currents into the load being energized. Energization transients are often reflected back into the power system which can disrupt the operation of power quality sensitive electrical loads such as computers and medical equipment connected to the system. Power quality sensitive electronics are in increasing use and thus control of energization transients has become an important concern to the power industry.

Over the past twenty years, two main methods have evolved to limit inrush currents as a way of reducing energization transients. A first method involves pre-insertion of damping resistors or inductors. This involves insertion of an impedance such as a resistor and/or inductor in series with each leg of the load. Each resistor and/or inductor is then bypassed after the leg has been energized and has reached a steady state condition. The use of a resistor tends to increase the damping of the overall circuit, resulting in faster disappearance of transients. The main disadvantage of this method is the need for a separate bypass circuit breaker and resistor for each phase. Systems of this type are described in U.S. Pat. Nos. 6,018,473, 6,218,652, 4,695,918, for example.

A second method involves precisely controlling the closing instant of the switches or breakers connecting the load to the power system such that each breaker is closed at precisely the instant when the system voltage or current, depending on the load, in the corresponding phase is zero. If the load is capacitive, the breaker associated with each phase is closed when the voltage of the corresponding phase is zero. If the load is inductive, the breaker is closed when the voltage is maximum and current is zero. With the advancement of microprocessor technology, this method has become technically feasible and has gained acceptance in industry. This method however requires specially designed circuit breakers that have consistent mechanical operation characteristics over a wide range of installation and temperature conditions. The tolerance for error on closing time is very small (less than 2 to 5 milliseconds). The reliability of such a scheme and the sophistication involved makes it unattractive for general applications. This technology and its variations are described in U.S. Pat. Nos. 5,838,077, 6,523,654, for example.

A variation of the first method above, for use with transformer loads involves the connection of a resistor between the transformer neutral and ground. This scheme has been described in B. Holmgrem, R. S. Jenkins and J. Rinbrugent, "Transformer inrush current," *CIGRE Proc. Of the 22nd session*, vol. 1, 12-03, pp. 1–13, 1968 and R. Yacamini and A. Abu-Nasser, "The calculation of inrush current in three-phase transformers," *IEE Proc.-Electr. Power Appl.*, vol. 133, no. 1, pp. 31–40, January 1986. Both papers describe concurrent energization of all three legs and both concluded that the neutral resistor has no effect on limiting inrush currents.

Another attempt to simplify the first method is described in U.S. Pat. No. 6,337,802 and involves the use of one series resistor switched into different phases of the load so that the effect of three resistors is at least partially realized. This method appears to be suited for low or medium voltage converter applications and could be more expensive than the basic series resistor method if applied to high voltage power systems as it requires several additional switches.

The present invention addresses the above problems.

SUMMARY OF THE INVENTION

In accordance with one aspect of the invention, there is provided a method of reducing energization transients in a three phase Y-connected load having legs A, B and C associated with corresponding phases of a three-phase AC power system. The method involves energizing respective legs of the load in an order determined by a energization sequence dependent upon a type of the load. The energization sequence defines first, second and third legs of the legs A, B and C to be energized. The method also involves providing a conduction path for current to flow between a neutral point of the Y-connected load to ground through a transient-limiting impedance while the first, second and third legs are being energized. The transient limiting impedance has an impedance value selected such that after the first leg is energized, an energization transient produced on energizing the second leg and an energization transient produced on energizing the third leg are both approximately minimized.

The energization transient may be current or voltage.

The method may involve selecting the impedance value of the transient-limiting impedance such that the energization transient produced on energizing the second leg may be approximately equal to the energization transient produced on energizing the third leg.

The impedance value of the transient-limiting impedance may be selected such that the impedance value of the transient-limiting impedance may be approximately equal to an impedance value at which a first curve depicting transient magnitude vs. transient-limiting impedance for the second leg intersects with a second curve depicting transient magnitude vs. transient-limiting impedance for the third leg.

Energizing may involve closing first, second and third switches associated with respective legs of the load. The switches may include circuit breakers.

The transient-limiting impedance may be selected such that when the first and second legs are energized, a steady state open circuit voltage across the third switch is approximately equal to a steady state open circuit voltage across the second switch when only the first leg is energized.

The transient-limiting impedance may be selected to cause a minimum steady state open circuit voltage to appear across the third switch when the first and second legs are energized and to cause the minimum steady state open circuit voltage to appear across the second switch when only the first leg is energized.

The transient-limiting impedance may include at least one of a resistive component and a reactive component.

The transient-limiting impedance may be selected as a function of an open circuit reactance of the Y-connected load.

The Y-connected load may be a predominantly inductive load type and the energization sequence may cause leg A to be the first leg to be energized, leg B to be the second leg energized and leg C to be the third leg energized.

The Y-connected load may include transformer having a three-limb core structure.

The Y-connected load may include a transformer having a delta-connected secondary winding.

The transient-limiting impedance may be predominantly resistive.

The transient-limiting impedance may include a resistive component having a resistance of approximately 0.085Xopen, where Xopen is a open circuit reactance of the Y-connected load.

The Y-connected load may be a predominantly capacitive load type and the energization sequence may cause the first leg to be energized to be leg A, the second leg to be energized leg C and the third leg to be energized leg B.

The transient-limiting impedance may include a resistive component and an inductive reactive component in series. The resistive component may have a resistance of approximately 0.085Xopen, where Xopen is an open circuit reactance of the Y-connected load and the inductive reactive component may have a reactance of approximately Xopen/3.

The second leg may be energized a period of time after the first leg is energized and the third leg may be energized the period of time after the second leg is energized. The period of time may be greater than or equal to a time period associated with approximately one cycle of an AC waveform associated with the three phase power system. The period of time may be greater than or equal to approximately 0.01 seconds. The period of time may be between approximately 0.01 seconds and 1 second. In general, the period of time can be as short as several cycles or as long as several seconds. The period of time must however be long enough to permit transients produced on energizing a previous leg to be diminished to a sufficient level.

The method may further involve disconnecting the Y-connected load from the transient-limiting impedance after the third leg is energized. The Y-connected load may be disconnected from the transient-limiting impedance a period of time after the third leg is energized. The period of time may be greater than or equal to a time period associated with approximately one cycle of an AC waveform associated with the three phase power system. The period of time may be greater than or equal to approximately 0.01 seconds. The period of time may be between approximately 0.01 seconds and 1 second. In general, disconnecting the transient-limiting impedance from the Y-connected load can be initiated as soon as the transients produced on energizing the third leg have subsided to a sufficient level.

The method may further comprise connecting the neutral point of the Y-connected load directly to ground after the third leg is energized. The neutral point of the Y-connected load may be connected directly to ground a period of time after the third leg is energized. The period of time may be greater than or equal to a time period associated with approximately one cycle of an AC waveform associated with the three phase power system. The period of time may be greater than or equal to approximately 0.01 seconds. The period of time may be between approximately 0.01 seconds and 1 second. In general, connecting the neutral point directly to ground can be initiated as soon as the transients produced on energizing the third leg have subsided to a sufficient level.

In accordance with another aspect of the invention there is provided an energization transient limited three phase AC power system apparatus. The apparatus includes a three phase Y-connected load having a common neutral point and legs A, B and C associated with corresponding phases of the three-phase AC power system and switches operable to connect respective corresponding phases of the three phase power system to the legs A, B and C of the Y-connected load. The apparatus further includes a switch controller operable to actuate the switches to energize respective legs of the load in an order determined by an energization sequence dependent upon a type of the load, the energization sequence defining first, second and third legs of the legs A, B and C to be energized. The apparatus may further include a conduction path for current to flow between the common neutral point and ground while the first, second and third legs are being energized. The conduction path includes a transient-limiting impedance having an impedance value such that after the first leg is energized, an energization transient produced on energizing the second leg and an energization transient produced on energizing the third leg are both approximately minimized.

The switches may include first, second and third switches associated with the first, second and third legs respectively.

The apparatus may further include a disconnect operable to disconnect the Y-connected load from the transient-limiting impedance after the third leg has been energized. The switch controller may be operable to control the disconnect. The switch controller may cause the disconnect to be actuated a period of time after the third leg is energized. The period of time may be greater than or equal to a time period associated with approximately one cycle of an AC waveform associated with the three phase power system. The period of time may be greater than or equal to approximately 0.01 seconds. The period of time may be between approximately 0.01 seconds and 1 second.

The apparatus may further include a bypass switch operable to connect the neutral point directly to ground after the third leg is energized. The switch controller may be operable to control the bypass switch. The switch controller may cause the bypass switch to be closed a period of time after the third leg is energized. The period of time may be greater than or equal to a time period associated with approximately one cycle of an AC waveform associated with the three phase power system. The period of time may be greater than or equal to approximately 0.01 seconds. The period of time may be between approximately 0.01 seconds and 1 second.

In accordance with another aspect of the invention, there is provided an energization transient limited three phase AC power system apparatus. The apparatus includes a three phase Y-connected load having a common neutral point and legs A, B and C associated with corresponding phases of the three-phase AC power system. The apparatus further includes provisions for energizing respective legs of the load from the corresponding phases of the three phase AC power system, in an order determined by a energization sequence dependent upon a type of the load, the energization sequence defining the first, second and third legs of the legs A, B and C to be energized. The apparatus further includes a conduction path for current to flow between the common neutral point and ground while the first, second and third legs are being energized. The conduction path includes a transient-limiting impedance having an impedance value such that after the first leg is energized, an energization transient produced on energizing the second leg and an energization transient produced on energizing the third leg are both approximately minimized.

The provisions for energizing may include switching provisions operable to connect respective corresponding phases of the three phase power system to the legs A, B and C of the Y-connected load.

The switching provisions may include switches operable to connect the legs A, B and C of the Y-connected load to respective corresponding phases of the three phase power system and a switch controller operable to actuate the switches to energize respective legs of the load in the energization sequence.

Apparatus and methods according to this invention are simple and cost-effective. Precise control of the switch closing instants when energizing each leg is not required thereby allowing less expensive switches or breakers and switching controllers. The transient-limiting impedance can be left in the circuit after energization since it will not affect the normal operation of the power system. Where the transient-limiting impedance is bypassed or disconnected after energization, it will be appreciated that the rating of the bypass switch or disconnect can be relatively low since the transient-limiting impedance does not carry voltage or current when the energized system enters a balanced steady state.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
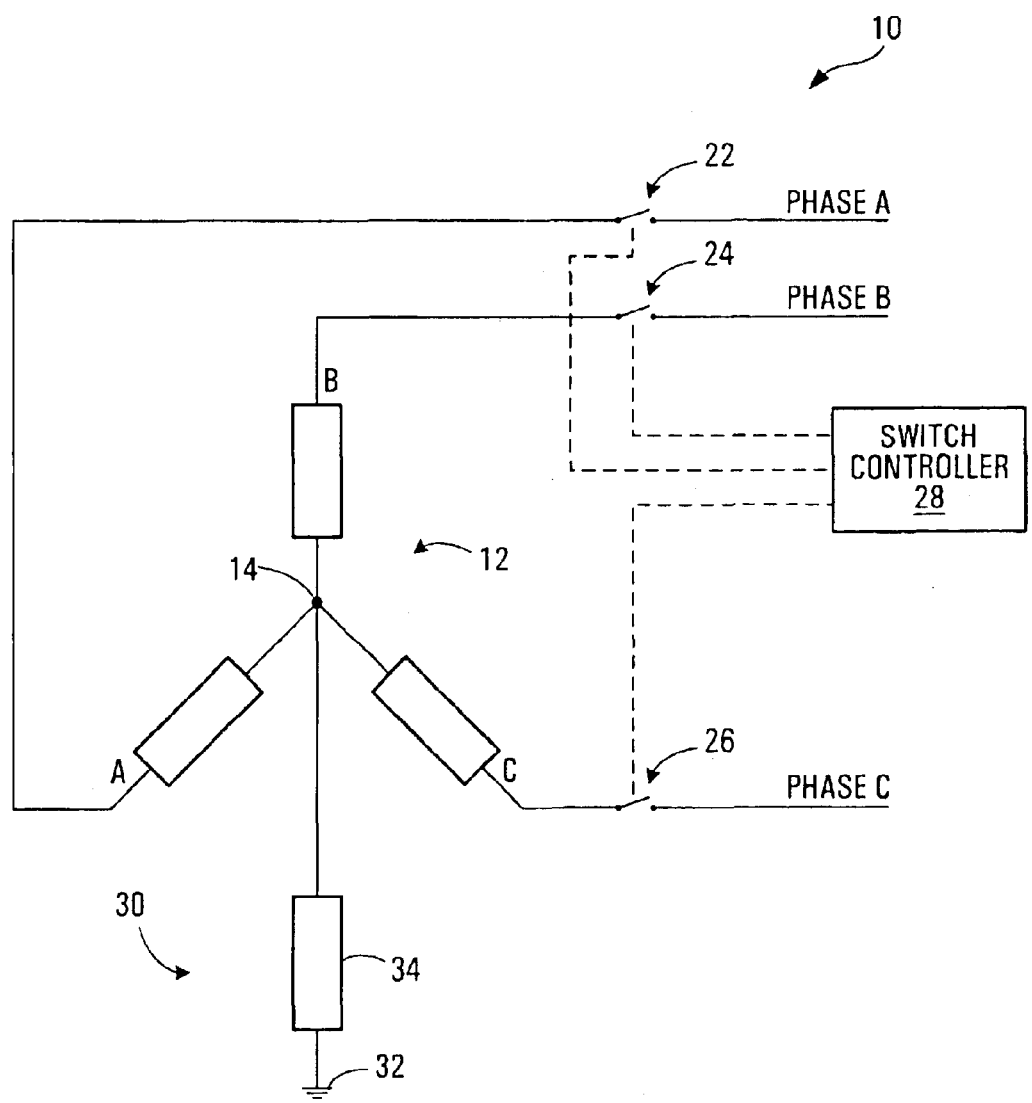
FIG. 1 is a schematic diagram of an apparatus according to a first embodiment of the invention.

Referring to FIG. 1, an energization transient limited three-phase AC power system apparatus is shown generally at 10. The apparatus includes a three-phase Y-connected load 12 having a common neutral point 14 and legs A, B, and C connected to the common neutral point and associated with corresponding phases A, B and C of a three-phase AC power system. The apparatus further includes switches 22, 24 and 26 operable to connect respective legs of the Y-connected load 12 to respective phases A, B and C of the three-phase power system. The switches 22, 24 and 26 may include circuit breakers, for example.

The apparatus 10 further includes a switch controller 28 operable to actuate the switches 22, 24 and 26 to energize respective legs of the load 12 in an order determined by an energization sequence dependent upon a type of the load. The energization sequence defines the first, second and third legs of legs A, B and C to be energized, in succession.

The switch controller 28 actuates the switches 22, 24 and 26 to cause the second leg in the energization sequence to be energized a period of time after the first leg in the energization sequence is energized and causes the third leg in the energization sequence to be energized a period of time after the second leg is energized. This period of time may be greater than or equal to a time period associated with approximately one cycle of an AC waveform associated with the three phase power system and in any event is long enough to permit any transients to settle such that a steady state condition is achieved. A suitable time period might be approximately 0.01 seconds, or between approximately 0.01 seconds and 1 second, for example.

The switch controller 28 employs different energization sequences that actuate the switches 22, 24 and 26 in different sequences depending on the type of load 12. In particular, for a predominantly inductive load, the switch controller 28 employs an inductive load energization sequence that actuates the switches 22, 24, 26 to energize the legs of the load in the order A, B, C. That is, the first switch to be actuated is switch 22 associated with leg A. The second switch to be actuated is switch 24 associated with leg B and the third switch to be actuated is switch 26 associated with leg C. The order A, B, C includes the order B, C, A and C, A, B since the labels A, B and C are sequential but arbitrary.

Where the Y-connected load is a predominantly capacitive load, the switch controller 28 employs a capacitive load energization sequence that actuates switch 22 associated with leg A, then switch 26 associated with leg C and then switch 24 associated with leg B to energize the legs in the order A, C, B. The order A, C, B includes the order C, B, A and B, A, C since the labels A, B, C are sequential but arbitrary.

The apparatus 10 further comprises a conduction path shown generally at 30 that enables current to flow between the common neutral point 14 and ground 32 through a transient-limiting impedance 34 while the first, second and third legs of the applicable energization sequence are being energized. The transient-limiting impedance 34 has a value such that after the first leg of the sequence is energized, an energization transient produced on energizing the second leg of the sequence and an energization transient produced on energizing the third leg of the sequence are both approximately minimized or reduced to an acceptable level. For an inductive load, the second leg of the sequence to be energized would be leg B and the third leg to be energized would be leg C. For a capacitive load, the second leg of the sequence to be energized would be leg C and the third leg to be energized would be leg B.

The energization transient produced on energizing the second and third legs of the energization sequence is a voltage or current transient, depending upon whether the Y-connected load 12 is predominantly inductive or capacitive. Where the Y-connected load is predominantly inductive, the energization transient of interest for determining the transient-limiting impedance is current, whereas for a capacitive load, the energization transient of interest is voltage.

Figure 2:
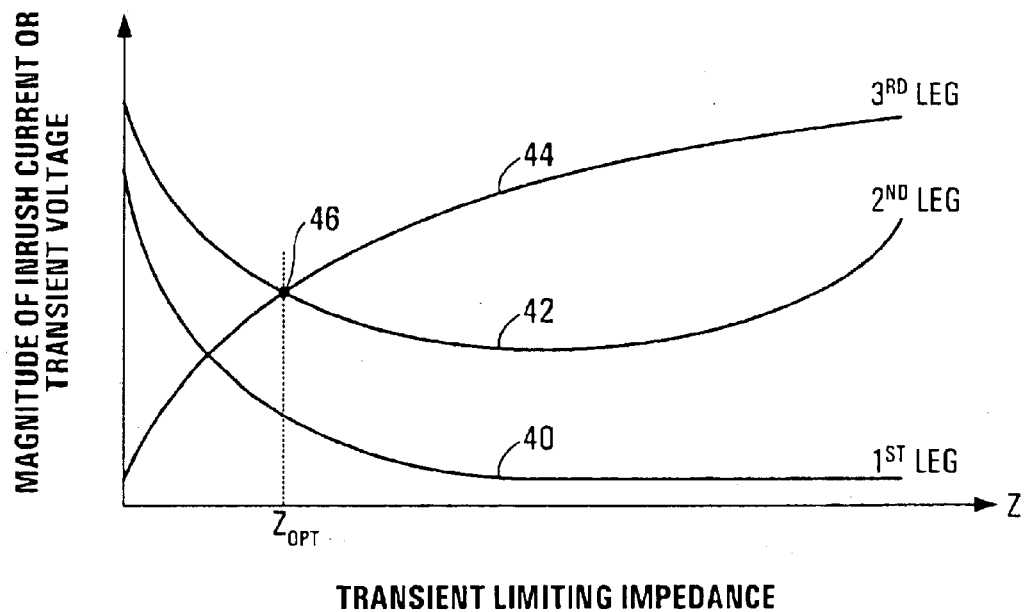
FIG. 2 is a graph illustrating inrush current/transient voltage versus transient-limiting impedance for each of three legs of a Y-connected load, for use in selecting an optimal transient-limiting impedance value.

FIG. 2 shows a plot of magnitude of inrush current/ transient voltage versus transient-limiting impedance. In the case of an inductive load, the magnitude of inrush current is plotted against transient-limiting impedance. In the case of a capacitive load, the magnitude of transient voltage is plotted against transient-limiting impedance. FIG. 2 shows a first curve 40 depicting magnitude of inrush current/transient voltage versus transient-limiting impedance for the first leg to be energized.

The curve 40 may be produced according to numerical simulation methods, for example. Effectively, the magnitude of the inrush current or transient voltage in the first leg to be energized is dependent upon the impedance of the leg itself and the impedance of the transient-limiting impedance 34 shown in FIG. 1 and is thus a relatively simple calculation independent of the remaining legs.

FIG. 2 also shows a second curve 42 plotting magnitude of inrush current/transient voltage versus transient-limiting impedance for the second leg to be energized. The second curve 42 shows a current or transient voltage that initially decreases with increasing transient-limiting impedance and then increases with increasing transient-limiting impedance. FIG. 2 also shows a third curve 44 depicting magnitude of inrush current/transient voltage versus transient-limiting resistance for the third leg to be energized and shows an increasing inrush current or transient voltage in response to an increasing transient-limiting impedance.

The inrush current through the first leg to be energized is independent of the impedance of the second and third legs, therefore a lowest transient-limiting impedance value for which the energization transient (inrush current or transient voltage) is approximately the equal for both the second and third legs to be energized is a reasonable compromise to reduce inrush currents in all three legs. In the example shown in FIG. 2, a optimum impedance Zopt may be defined as the impedance corresponding to an intersection 46 of the second and third curves 42 and 44. More succinctly, a fairly optimum transient-limiting impedance value may be selected as an impedance value approximately equal to an impedance value at which a curve depicting transient magnitude versus transient-limiting impedance for the second leg to be energized intersects with a curve depicting magnitude versus transient-limiting impedance for the third leg to be energized. At typical power system frequencies of 60 Hz, for example, any transient-limiting impedance value within about −20% to +30% of the optimal impedance value calculated using the method shown in FIG. 2 will provide a significant reduction in energization transients.

As a practical matter, the use of the curves shown in FIG. 2 is particularly well suited to numerical simulation techniques, but is difficult to verify in practice. A practical method of determining an approximate transient-limiting impedance 34 is to select an impedance value such that when the first and second switches defined by the energization sequence are actuated and the corresponding legs of the load are energized, a minimum steady state open circuit voltage across the third switch is approximately equal to a minimum steady state open circuit voltage across the second switch when only the first leg is energized. Thus, an optimal transient-limiting impedance value can be obtained by successively energizing the legs of the load 12 in the appropriate energization sequence determined by the load type, with different impedances being used as the transient-limiting impedance 34, while measuring the open circuit voltage across the second and third switches at appropriate times during the energization sequence and selecting an impedance which produces the least difference in voltage between the open circuit voltage across the third switch when the first and second legs are energized and the open circuit voltage across the second switch in the energization sequence when only the first leg 14 of the load 12 is energized. The impedance that produces the minimum same open circuit voltage across the second and third switches to be energized is an optimum transient-limiting impedance. An appropriate time for measuring the open circuit voltage across the second switch is just before actuating the second switch and an appropriate time for measuring the open circuit voltage across the third switch is just before actuating the third switch.

Figure 3:
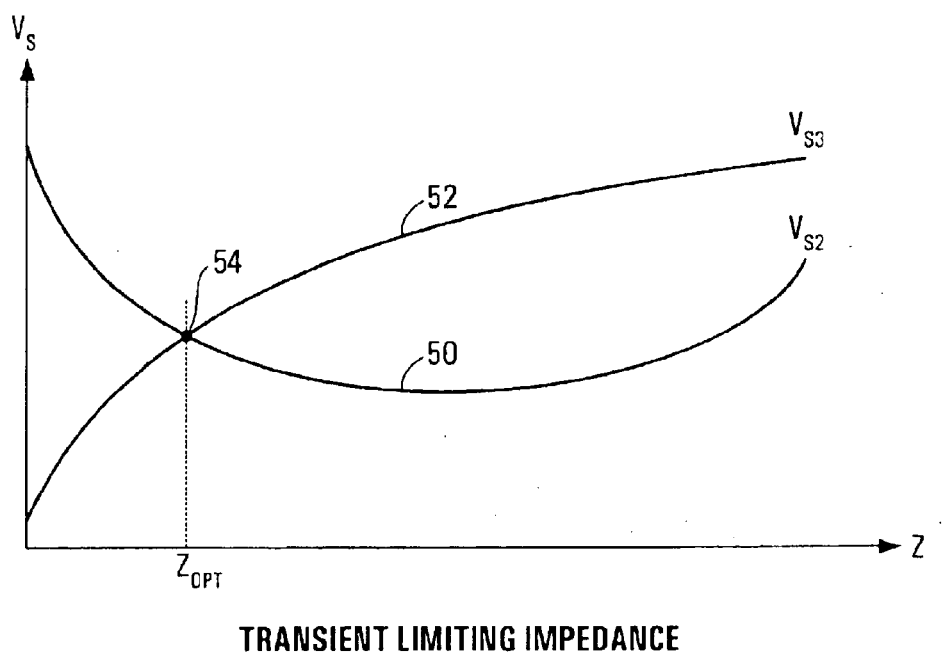
FIG. 3 is a graph of open circuit voltage versus transient-limiting impedance for switches associated with second and third legs of the load to be energized for alternative use in determining an optimal transient-limiting impedance value.

Referring to FIG. 3, the voltages across the second and third switches actuated in the energization sequence may be plotted versus transient-limiting impedance, thereby producing a first open circuit voltage curve 50 representing open circuit voltage across the second switch to be actuated in the energization sequence while the first leg 14 is energized and a second curve 52 representing open circuit voltage across the third switch to be actuated in the energization sequence while the first and second legs 14 and 16 are energized. The voltage across the second switch to be actuated in the energization sequence initially decreases with increasing transient-limiting impedance and then increases. The voltage across the third switch to be actuated in the energization sequence increases with increasing transient-limiting impedance. A point of intersection 54 of the two curves 50 and 52 is associated with an optimal impedance value Zopt that reduces energization transients significantly. An impedance within a range of −20% to +30% of this Zopt has been found to produce satisfactory results.

It has been found that the optimum transient-limiting impedance includes at least one of a resistive component and a reactive component and one or both of these may be determined as a function of an open circuit reactance of the load.

Figure 4:
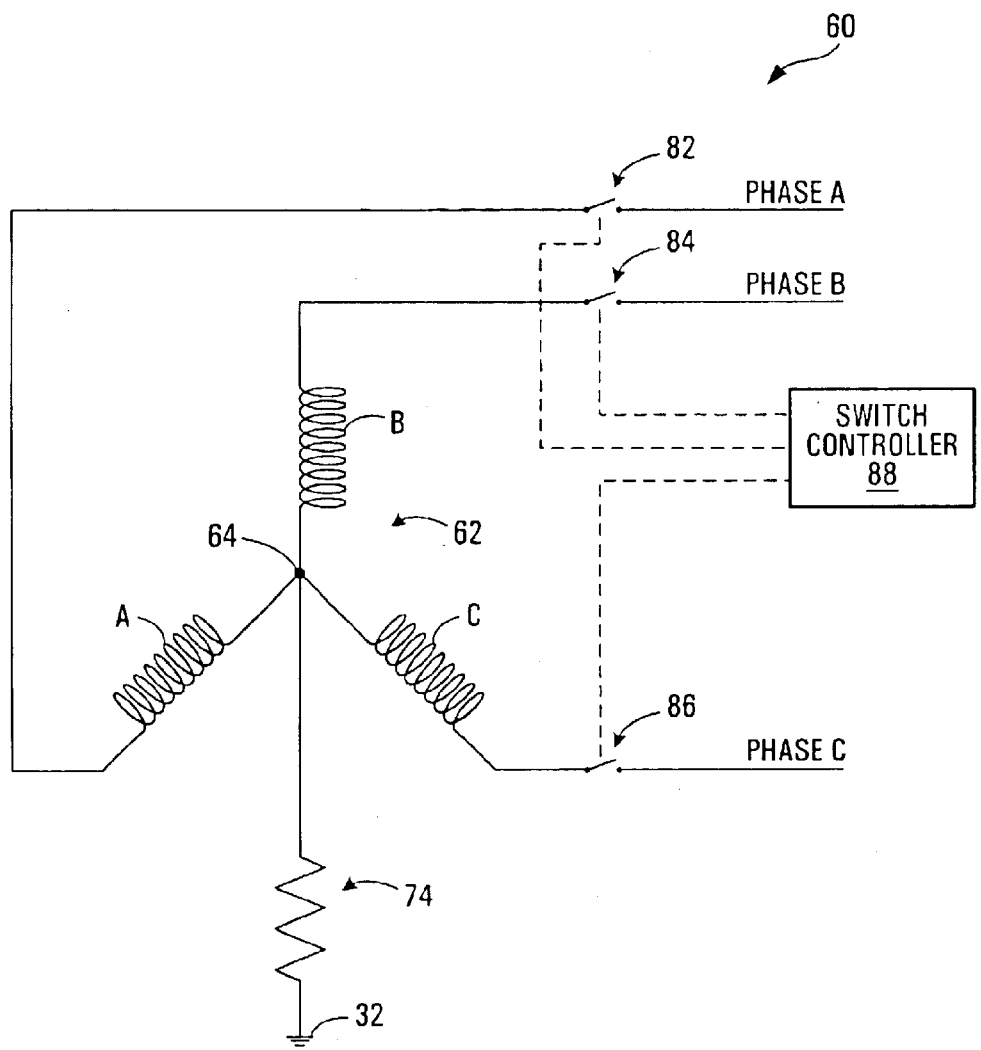
FIG. 4 is an apparatus according to a second embodiment of the invention in which the Y-connected load is predominantly inductive.

Referring to FIG. 4, an apparatus having an inductive Y-connected load is shown generally at 60. The inductive Y-connected load is shown at 62 and includes a neutral point 64 and predominantly inductive legs A, B and C connected to switches 82, 84 and 86, respectively, controlled by a switch controller 88. The inductive Y-connected load 62 may be a reactor or transformer load, for example. Where the load 62 is a transformer load, the Y-connection may refer to that of a primary winding of the transformer and such transformer may have a delta-connected secondary winding. Generally, if the transformer has a three-limb core structure, any secondary winding connection will be suitable and energization transients will be reduced accordingly. In general, a delta connection provides electrical coupling and a three-limb core structure provides magnetic coupling among the three legs of the load. The coupling, either electrical or magnetic, is important in reducing the inrush current. For transformers with either form of coupling, the maximum reduction of inrush current can be as high as 90%. For transformers without coupling, the maximum reduction of inrush current may be only about 30%.

It will be appreciated that each leg A, B and C of the Y-connected load has an open circuit reactance Xopen having a fixed value at the frequency (typically 50 or 60 Hz) of the power system. In general, predominantly resistive transient-limiting impedances have been found to be best suited for reducing energization transients in inductive Y-connected loads. For relatively small transformers with 120 volt Y-connected primary windings and delta-connected secondary windings with 30 KVA power ratings, for example, a transient-limiting impedance 74 having a resistance of approximately 0.085Xopen provides about 90% reduction in inrush current. In this embodiment, the energization sequence is A, B, C.

For the embodiment shown in FIG. 4, a further simplified method to determine the optimum transient-limiting impedance may involve establishing analytical formulas for the two open circuit voltage versus transient limiting impedance curves shown in FIG. 3. The analytical formulas may be used to express the open circuit voltages as functions of the transient-limiting impedance and the load parameters such as Xopen. As an example, the open circuit voltages can be expressed with the following formulas for the inductive load type assuming the switching sequence is A, B and C:

$$|V_{S2}| = E\sqrt{3 + X_{open}\frac{X_{open} + \sqrt{3}R_N}{R_N^2 + 4X_{open}^2/9}}$$

$$|V_{S3}| = E\sqrt{\frac{9R_N^2}{4R_N^2 + X_{open}^2/9}}$$

where
- $|V_{s2}|$ is the open circuit voltage across the second switch in the applicable energization sequence after the first leg has been energized,
- $|V_{s3}|$ is the open circuit voltage across the third switch in the applicable energization sequence after the first and second legs have been energized,
- E is the phase to ground voltage of the supply power system,
- $R_N$ is the resistance value of the transient-limiting resistance, and
- $X_{open}$ is the (positive sequence) open circuit impedance of the load.

The above equation is applicable for transformers with a delta-connected secondary winding or with a three-limb core structure. These transformers have a mutual coupling among the three phases. The intersection point of the two curves can be obtained by letting:

$$|V_{s2}|=|V_{s3}|$$

The result is the formula to calculate the optimal $R_N$, Ropt=0.085Xopen, for transformers with a delta-connected secondary winding or with a three-limb core structure.

A similar set of formulas can be derived for the capacitive loads and other inductive loads.

Figure 5:
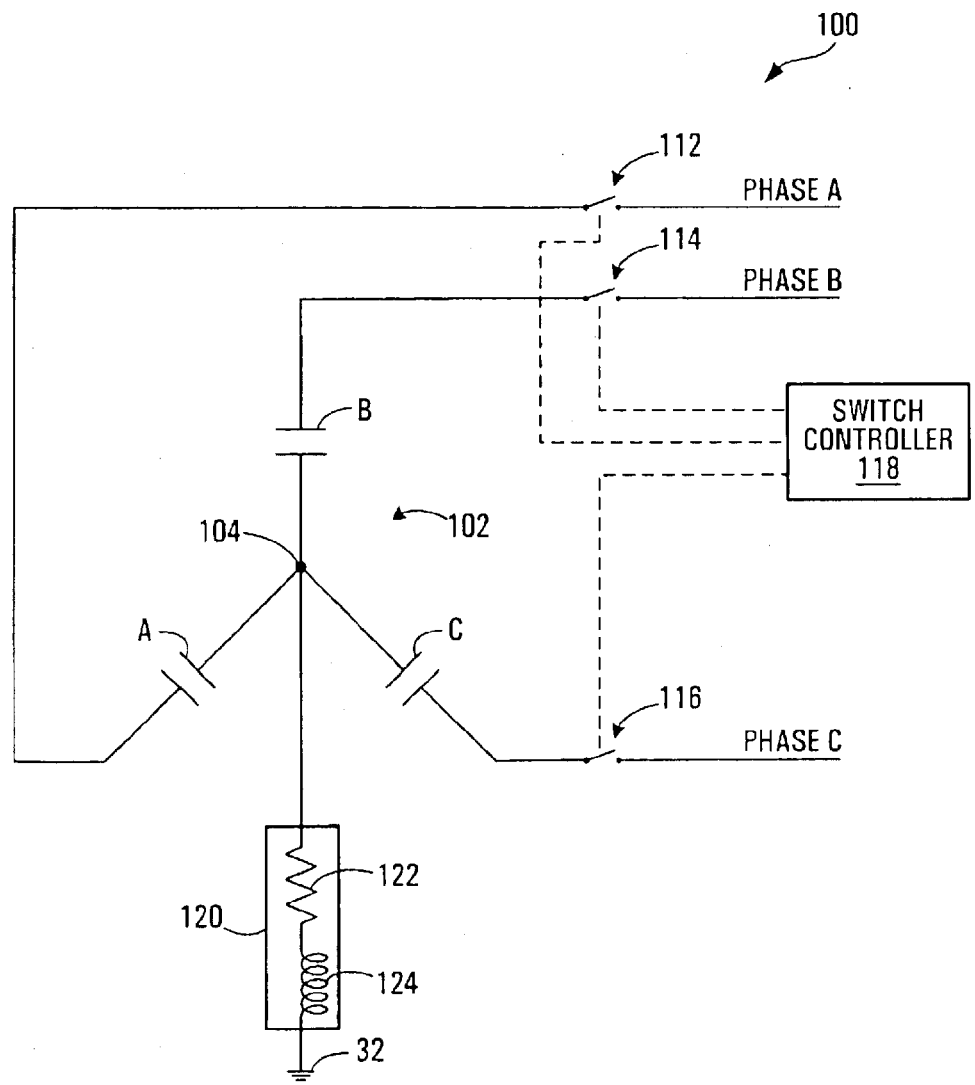
FIG. 5 is an apparatus according to a third embodiment of the invention in which the Y-connected load is predominantly capacitive.

Referring to FIG. 5, an apparatus 100 is shown having a capacitive Y-connected load 102 having a neutral point 104 and predominantly capacitive legs A, B, C, respectively, connected to switches 112, 114 and 116 controlled by a switch controller 118. In this embodiment, each leg A, B, C, of the capacitive Y-connected load 102 has an open circuit capacitive reactance $$X_c = \frac{1}{\omega C}$$

where C is the capacitance of a given leg (which may include a capacitor bank) and $\omega$ is the angular frequency of the power supply system. In this embodiment, a transient-limiting impedance 120 includes a resistor 122 and an inductor 124 connected in series between the neutral point 104 and ground 32. In this embodiment, the resistor value may be calculated as a first proportion of the capacitive reactance $X_c$, such as $0.085X_c$ and the inductance may be calculated as a second proportion of the capacitive reactance, for example, $\frac{1}{3}X_c$. The corresponding reduction of transient voltage is about 40%. The reduced effect of limiting transient voltage in the capacitive load case is due to the fact that there is no electrical or magnetic coupling among the three phases of a capacitive load. In this embodiment, the energization sequence is A, C, B.

Figure 6:
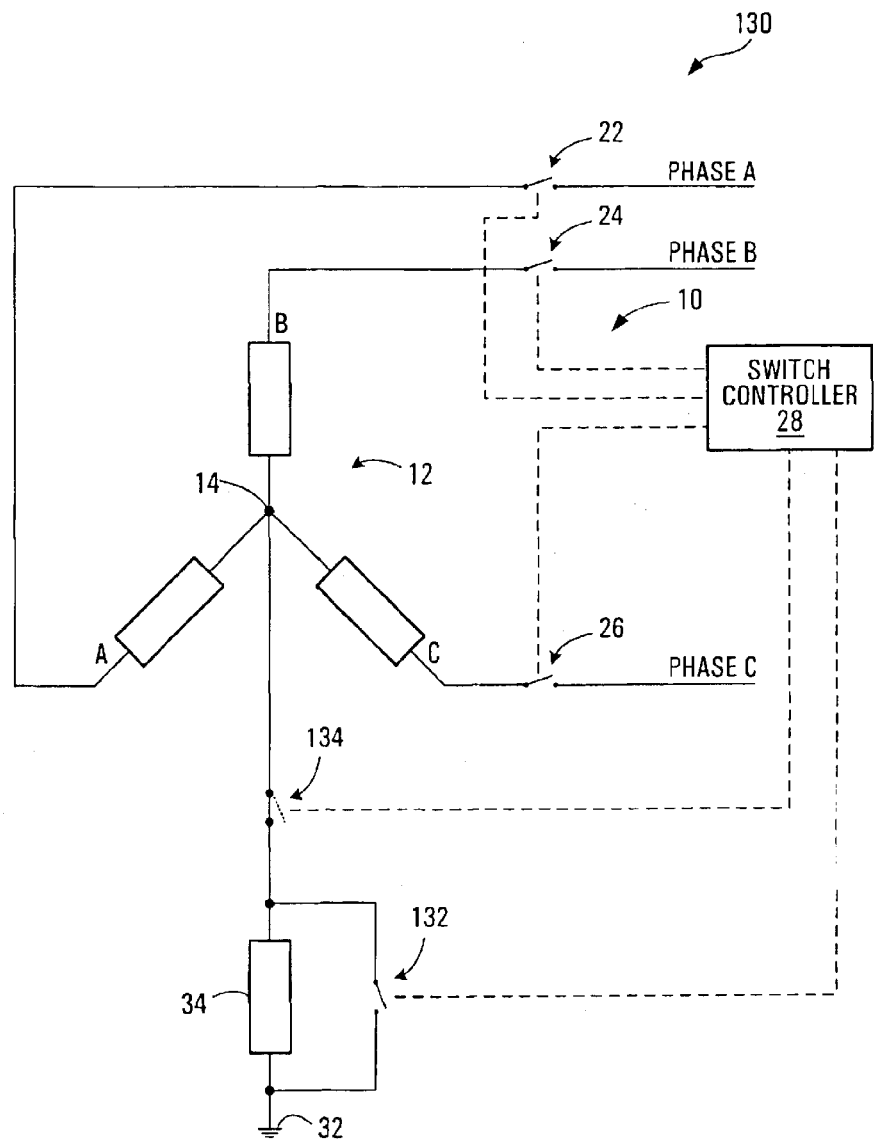
FIG. 6 is a schematic diagram of an apparatus according to fourth and fifth embodiments of the invention for use with grounded neutral and ungrounded neutral systems respectively.

Referring to FIG. 6, an apparatus according to an alternative embodiment of the invention is shown generally at 130 and includes the apparatus 10 shown in FIG. 1 with a bypass switch 132 connected across the transient-limiting impedance 34 and controlled by the switch controller 28. In this embodiment, the switch controller 28 functions such that the bypass switch 132 is open during energization of the load 12 and after the load has been energized by actuating the switches 22, 24 and 26 in the appropriate order for the type of load, the bypass switch 132 is closed so that a direct connection is made between the neutral point 14 and ground 32. The switch controller 28 actuates the bypass switch 132 a period of time after the third leg of the energization sequence is energized. This period of time may be greater than or equal to a time period associated with approximately one cycle of an AC waveform associated with the three phase power system. A suitable time period might be approximately 0.01 seconds, or between approximately 0.01 seconds and 1 second, for example.

Alternatively, a disconnect 134, such as a switch or circuit breaker, may be placed in series between the neutral point 14 and the transient-limiting impedance 34 and the bypass switch 132 is omitted. In this embodiment, the switch controller 28 controls the disconnect 134 such that it is closed when the load 12 is being energized and is opened after the third leg is the energization sequence has been energized. This configuration is suitable for an ungrounded neutral system.

The switch controller 28 may actuate the disconnect 134 a period of time after the third leg is energized. This period of time may be greater than or equal to a time period associated with approximately one cycle of an AC waveform associated with the three phase power system. A suitable time period might be approximately 0.01 seconds, or between approximately 0.01 seconds and 1 second, for example.

It will be appreciated that a separate switch controller (not shown) separate from switch controller 28 may be used to control the bypass switch 132 or disconnect 134, respectively.

While specific embodiments of the invention have been described and illustrated, such embodiments should be considered illustrative of the invention only and not as limiting the invention as construed in accordance with the accompanying claims.

What is claimed is:

1. A method of reducing energization transients in a three phase Y-connected load having legs A, B and C associated with corresponding phases of a three-phase AC power system, the method comprising:
   energizing respective legs of said load in an order determined by a energization sequence dependent upon a type of said load, said energization sequence defining first, second and third legs of said legs A, B and C to be energized,
   providing a conduction path for current to flow between a neutral point of the Y-connected load to ground through a transient-limiting impedance while said first, second and third legs are being energized;
   said transient limiting impedance having an impedance value selected such that after said first leg is energized, an energization transient produced on energizing said second leg and an energization transient produced on energizing said third leg are both approximately minimized.

2. The method of claim 1 wherein said energization transient is current.

3. The method of claim 1 wherein said energization transient is voltage.

4. The method of claim 1 wherein said impedance value of said transient-limiting impedance is selected such that said energization transient produced on energizing said second leg is approximately equal to said energization transient produced on energizing said third leg.

5. The method of claim 1 wherein said impedance value of said transient-limiting impedance is selected such that said impedance value of said transient-limiting impedance is approximately equal to an impedance value at which a first curve depicting transient magnitude vs. transient-limiting impedance for said second leg intersects with a second curve depicting transient magnitude vs. transient-limiting impedance for said third leg.

6. The method of claim 1 wherein energizing comprises closing first, second and third switches associated with respective legs of said load.

7. The method of claim 6 wherein, when said first and second legs are energized, a steady state open circuit voltage across said third switch is approximately equal to a steady state open circuit voltage across said second switch when only said first leg is energized.

8. The method of claim 7 wherein said transient-limiting impedance causes a minimum steady state open circuit voltage to appear across said third switch when said first and second legs are energized and wherein said minimum steady state open circuit voltage appears across said second switch when only said first leg is energized.

9. The method of claim 1 wherein said transient-limiting impedance includes at least one of a resistive component and a reactive component.

10. The method of claim 9 wherein said transient-limiting impedance is selected as a function of an open circuit reactance of said Y-connected load.

11. The method of claim 1 wherein said Y-connected load is a predominantly inductive load type and wherein said first leg is leg A, wherein second leg is leg B and wherein said third leg is leg C of said Y-connected load.

12. The method of claim 11 wherein said Y-connected load is comprised of a transformer having a three-limb core structure.

13. The method of claim 11 wherein said Y-connected load includes a transformer having a delta-connected secondary or tertiary winding.

14. The method of claim 11 wherein said transient-limiting impedance is predominantly resistive.

15. The method of claim 11 wherein said transient-limiting impedance includes a resistive component having a resistance of approximately $0.085 X_{open}$, where $X_{open}$ is an open circuit reactance of said Y-connected load.

16. The method of claim 1 wherein said Y-connected load is a predominantly capacitive load type and wherein said first leg is leg A, wherein said second leg is leg C and wherein said third leg is leg B.

17. The method of claim 16 wherein said transient-limiting impedance includes a resistive component and an inductive reactive component in series.

18. The method of claim 17 wherein said resistive component has a resistance of approximately $0.085 X_{open}$, where $X_{open}$ is an open circuit reactance of said Y-connected load and where said inductive reactive component has a reactance of approximately $X_{open}/3$.

19. The method of claim 1 wherein said second leg is energized a period of time after said first leg is energized and wherein said third leg is energized said period of time after said second leg is energized.

20. The method of claim 19 wherein said period of time is greater than or equal to a time period associated with approximately one cycle of an AC waveform associated with said three phase power system.

21. The method of claim 19 wherein said period of time is greater than or equal to approximately 0.01 seconds.

22. The method of claim 19 wherein said period of time is between approximately 0.01 seconds and 1 second.

23. The method of claim 1 further comprising disconnecting said Y-connected load from said transient-limiting impedance after said third leg is energized.

24. The method of claim 23 wherein said Y-connected load is disconnected from said transient-limiting impedance a period of time after said third leg is energized.

25. The method of claim 24 wherein said period of time is greater than or equal to a time period associated with approximately one cycle of an AC waveform associated with said three phase power system.

26. The method of claim 24 wherein said period of time is greater than or equal to approximately 0.01 seconds.

27. The method of claim 24 wherein said period of time is between approximately 0.01 seconds and 1 second.

28. The method of claim 1 further comprising connecting said neutral point of said Y-connected load directly to ground after said third leg is energized.

29. The method of claim 1 wherein said neutral point of said Y-connected load is connected directly to ground a period of time after said third leg is energized.

30. The method of claim 29 wherein said period of time is greater than or equal to a time period associated with approximately one cycle of an AC waveform associated with said three phase power system.

31. The method of claim 30 wherein said period of time is greater than or equal to approximately 0.01 seconds.

32. The method of claim 30 wherein said period of time is between approximately 0.01 seconds and 1 second.

33. An energization transient limited three phase AC power system apparatus comprising:

a three phase Y-connected load having a common neutral point and legs A, B and C associated with corresponding phases of the three-phase AC power system;

switches operable to connect respective said corresponding phases of said three phase power system to said legs A, B and C of said Y-connected load;

a switch controller operable to actuate said switches to energize respective legs of said load in an order determined by an energization sequence dependent upon a type of said load, said energization sequence defining first, second and third legs of said legs A, B and C to be energized;

a conduction path for current to flow between said common neutral point and ground while said first, second and third legs are being energized, said conduction path comprising a transient-limiting impedance having an impedance value such that after said first leg is energized, an energization transient produced on energizing said second leg and an energization transient produced on energizing said third leg are both approximately minimized.

34. The apparatus of claim 33 wherein said switches include first, second and third switches associated with said first, second and third legs respectively.

35. The apparatus of claim 33 wherein said energization transient is current.

36. The apparatus of claim 33 wherein said energization transient is voltage.

37. The apparatus of claim 33 wherein said impedance value of said transient-limiting impedance is selected such that said energization transient produced on energizing said second leg is approximately equal to said energization transient produced on energizing said third leg.

38. The apparatus of claim 33 wherein said impedance value of said transient-limiting impedance is selected such that said impedance value is approximately equal to a value of impedance at which a first curve depicting transient magnitude vs. transient-limiting impedance for said second leg intersects with a second curve depicting transient magnitude vs. transient-limiting impedance for said third leg.

39. The apparatus of claim 33 wherein, a steady state open circuit voltage across said third switch when said first and second legs of said Y-connected load are energized, is approximately equal to a steady state open circuit voltage across said second switch when only said first leg is energized.

40. The apparatus of claim 39 wherein said transient-limiting impedance causes a minimum steady state open circuit voltage to appear across said third switch when said first and second legs are energized and wherein said minimum steady state open circuit voltage appears across said second switch when only said first leg is energized.

41. The apparatus of claim 33 wherein said transient-limiting impedance includes at least one of a resistive component and a reactive component.

42. The apparatus of claim 41 wherein said impedance value of said transient-limiting impedance is selected as a function of an open circuit reactance of said Y-connected load.

43. The apparatus of claim 33 wherein said Y-connected load is predominantly inductive and wherein said switch controller actuates said switches such that said first leg is leg A, said second leg is leg B and said third leg is leg C.

44. The apparatus of claim 43 wherein said Y-connected load includes a transformer having a three-limb core structure.

45. The apparatus of claim 43 wherein said Y-connected load includes a transformer having a delta-connected secondary winding.

46. The apparatus of claim 43 wherein said transient-limiting impedance is predominantly resistive.

47. The apparatus of claim 43 wherein said transient-limiting impedance includes a resistive component having a resistance of approximately 0.085Xopen, where Xopen is an open circuit reactance of said Y-connected load.

48. The apparatus of claim 33 wherein said Y-connected load is predominantly capacitive and wherein said switch controller actuates said switches such that said first leg is leg A, said second leg is leg C and said third leg is leg B.

49. The apparatus of claim 48 wherein said transient-limiting impedance includes a resistive component and an inductive reactive component in series.

50. The apparatus of claim 49 wherein said resistive component has a resistance of approximately 0.085Xopen, where Xopen is an open circuit reactance of said Y-connected load and wherein said inductive reactive component has a reactance of approximately Xopen/3.

51. The apparatus of claim 33 wherein said switch controller causes said second leg to be energized a period of time after said first leg is energized and wherein said switch controller causes said third leg to be energized a period of time after said second leg is energized.

52. The apparatus of claim 51 wherein said period of time is greater than or equal to a time period associated with approximately one cycle of an AC waveform associated with said three phase power system.

53. The apparatus of claim 51 wherein said period of time is greater than or equal to approximately 0.01 seconds.

54. The apparatus of claim 51 wherein said period of time is between approximately 0.01 seconds and 1 second.

55. The apparatus of claim 33 further comprising a disconnect operable to disconnect said Y-connected load from said transient-limiting impedance after said third leg has been energized.

56. The apparatus of claim 55 wherein said switch controller is operable to control said disconnect.

57. The apparatus of claim 56 wherein said switch controller causes said disconnect to be actuated a period of time after said third leg is energized.

58. The apparatus of claim 57 wherein said period of time is greater than or equal to a time period associated with approximately one cycle of an AC waveform associated with said three phase power system.

59. The apparatus of claim 57 wherein said period of time is greater than or equal to approximately 0.01 seconds.

60. The apparatus of claim 57 wherein said period of time is between approximately 0.01 seconds and 1 second.

61. The apparatus of claim 33 further comprising a bypass switch operable to connect said neutral point directly to ground after said third leg is energized.

62. The apparatus of claim 61 wherein said switch controller is operable to control said bypass switch.

63. The apparatus of claim 62 wherein said switch controller causes said bypass switch to be closed a period of time after said third leg is energized.

64. The apparatus of claim 63 wherein said period of time is greater than or equal to a time period associated with approximately one cycle of an AC waveform associated with said three phase power system.

65. The apparatus of claim 63 wherein said period of time is greater than or equal to approximately 0.01 seconds.

66. The apparatus of claim 63 wherein said period of time is between approximately 0.01 seconds and 1 second.

67. An energization transient limited three phase AC power system apparatus comprising:
   a three phase Y-connected load having a common neutral point and legs A, B and C associated with corresponding phases of the three-phase AC power system;
   means for energizing respective legs of said load from said corresponding phases of said three phase AC power system, in an order determined by a energization sequence dependent upon a type of said load, said energization sequence defining first, second and third legs of said legs A, B and C to be energized,
   a conduction path for current to flow between said common neutral point and ground while said first, second and third legs are being energized, said conduction path comprising a transient-limiting impedance having an impedance value such that after said first leg is energized, an energization transient produced on energizing said second leg and an energization transient produced on energizing said third leg are transient produced on energizing said third leg are both approximately minimized.

68. The apparatus of claim 67 wherein said energizing means comprises switching means operable to connect respective said corresponding phases of said three phase power system to said legs A, B and C of said Y-connected load.

69. The apparatus of claim 68 wherein said energizing means comprises:
   switches operable to connect said legs A, B and C of said Y-connected load to respective said corresponding phases of said three phase power system; and a switch controller operable to actuate said switches to energize respective legs of said load in said energization sequence.

70. The apparatus of claim 67 wherein said impedance value of said transient-limiting impedance is selected such that said energization transient produced on energizing said second leg is approximately equal to said energization transient produced on actuating said third leg.

* * * * *